US010911095B2

(12) United States Patent
Michaels

(10) Patent No.: US 10,911,095 B2
(45) Date of Patent: Feb. 2, 2021

(54) FALLTHROUGH CORRELATION TECHNIQUES FOR ARBITRARY-PHASE SPREAD SPECTRUM WAVEFORMS

(71) Applicant: TOKAY SYSTEMS LLC, Blacksburg, VA (US)

(72) Inventor: Alan Michaels, Blacksburg, VA (US)

(73) Assignee: TOKAY SYSTEMS LLC, Blacksburg, VA (US)

(*) Notice: Subject to any disclaimer, the term of this patent is extended or adjusted under 35 U.S.C. 154(b) by 0 days.

(21) Appl. No.: 16/119,734

(22) Filed: Aug. 31, 2018

(65) Prior Publication Data

US 2019/0068240 A1 Feb. 28, 2019

Related U.S. Application Data

(60) Provisional application No. 62/553,039, filed on Aug. 31, 2017, provisional application No. 62/553,035, filed on Aug. 31, 2017.

(51) Int. Cl.
*H04B 1/709* (2011.01)
*H04B 1/7093* (2011.01)
*H04L 27/227* (2006.01)

(52) U.S. Cl.
CPC ........... *H04B 1/709* (2013.01); *H04B 1/7093* (2013.01); *H04L 27/2278* (2013.01)

(58) Field of Classification Search
CPC ...... H04B 1/69; H04B 1/707; H04B 1/70712; H04B 1/709; H04B 1/7093; H04B 1/7097;

(Continued)

(56) References Cited

U.S. PATENT DOCUMENTS 5,237,587 A * 8/1993 Schoolcraft ............ H04B 1/707
375/150
5,918,161 A * 6/1999 Kumar ..................... G01S 19/22
342/357.61

(Continued)

OTHER PUBLICATIONS

B. G. Agee, R. J. Kleinman and J. H. Reed, "Soft synchronization of direct sequence spread-spectrum signals," in IEEE Transactions on Communications, vol. 44, No. 11, pp. 1527-1536, Nov. 1996.

(Continued)

*Primary Examiner* — Young T. Tse
(74) *Attorney, Agent, or Firm* — Trellis IP Law Group, PC

(57) ABSTRACT

A correlation apparatus including a sequence generator configured to generate a non-repeating preamble sequence which changes during each of a plurality of time epochs. The correlation apparatus includes a fallthrough correlator having a tapped delay line for receiving a set of complex-valued samples of a received signal. Each of a plurality of complex multipliers of the correlator is coupled to one of the delay line taps. Each multiplier multiplies, during one of the plurality of time epochs, one of the complex-valued samples of the received signal by one of a plurality of matched filter coefficients corresponding to the preamble sequence. A summation module includes a plurality of adders where a last of the plurality of adders outputs a correlation signal. A peak value of the correlation signals exceeds a threshold value when a sufficient correlation exists between the received signal and the values of the preamble sequence.

14 Claims, 11 Drawing Sheets

(58) Field of Classification Search
CPC .......... H04B 2201/70706; H04L 27/22; H04L 27/227; H04L 27/2273; H04L 27/2278; H04L 2203/00
USPC ....... 375/140, 142, 143, 147, 150, 152, 343, 375/350; 370/335, 337, 342, 344
See application file for complete search history.

(56) References Cited

U.S. PATENT DOCUMENTS

| | | | | |
|---|---|---|---|---|
| 6,037,835 | A * | 3/2000 | Smith | H04B 1/406 329/316 |
| 7,433,910 | B2 | 10/2008 | Rawlins et al. | |
| 8,064,552 | B2 | 11/2011 | Chester et al. | |
| 8,644,362 | B1 | 2/2014 | Lauer et al. | |
| 2003/0137765 | A1* | 7/2003 | Yamazaki | G11B 5/09 360/39 |
| 2006/0072653 | A1* | 4/2006 | Hafuka | H04B 1/7075 375/148 |
| 2008/0079634 | A1* | 4/2008 | Nakamura | G01S 3/46 342/368 |
| 2011/0038444 | A1* | 2/2011 | Goto | H04L 1/201 375/343 |
| 2014/0292548 | A1* | 10/2014 | Ling | H03M 7/40 341/67 |

OTHER PUBLICATIONS

R. Cameron and B. Woerner, "Performance analysis of CDMA with imperfect power control," in IEEE Transactions on Communications, vol. 44, No. 7, pp. 777-781, Jul. 1996.
R. Chakravarthy et al. "Primary User authentication of cognitive radio network using underlay waveform," 2017 Cognitive Communications for Aerospace Applications Workshop (CCAA), Cognitive Communications for Aerospace Applications Workshop (CCAA), 2017.
J. H. Cho and J. S. Lehnert, "Performance of a spatio-temporal matched filter receiver for DS/SSMA communications," in IEEE Journal on Selected Areas in Communications, vol. 18, No. 8, pp. 1505-1515, Aug. 2000.
G. E. Corazza and A. Vanelli-Coralli, "Burst vs. continuous pilot acquisition in wideband CDMA cellular mobile systems," WCNC. 1999 IEEE Wireless Communications and Networking Conference (Cat. No. 99TH8466), New Orleans, LA, 1999, pp. 1080-1084 vol. 3.
C. Du, H. Zeng, W. Lou and Y. T. Hou, "On cyclostationary analysis of WiFi signals for direction estimation," 2015 IEEE International Conference on Communications (ICC), London, 2015, pp. 3557-3561.
M. Fine and F. A. Tobagi, "Demand Assignment Multiple Access Schemes in Broadcast Bus Local Area Networks," in IEEE Transactions on Computers, vol. C-33, No. 12, pp. 1130-1159, Dec. 1984.
J. H. Fischer, J. H. Cafarella, C. A. Bouman, G. T. Flynn, V. S. Dolat and R. Boisvert, "Wide-band packet radio for muitipath environments," in IEEE Transactions on Communications, vol. 36, No. 5, pp. 564-576, May 1988.
F. Harris, C. Dick, and M. Rice, "Digital receivers and transmitters using polyphase filter banks for wireless communications," IEEE Trans. on Microwave Theory and Techn., vol. 51, pp. 1395-1412, Apr. 2003.
G. Heidari-Bateni and C. D. McGillem, "A chaotic direct-sequence spread-spectrum communication system," in IEEE Transactions on Communications, vol. 42, No. 234, pp. 1524-1527, Feb./Mar./Apr. 1994.
R. M. Hewlitt and E. S. Swartzlantler, "Canonical signed digit representation for FIR digital filters," 2000 IEEE Workshop on Signal Processing Systems. SiPS 2000. Design and Implementation (Cat. No. 00TH8528), Lafayette, LA, 2000, pp. 416-426.

G. Kaddoum and F. Gagnon, "Design of a High-Data-Rate Differential Chaos-Shift Keying System," in IEEE Transactions on Circuits and Systems II: Express Briefs, vol. 59, No. 7, pp. 448-452, Jul. 2012.
T. K. Ksheerasagar, S. Anuradha, G. Avadhootha, K. S. R. Charan and Sri Hari Rao P, "Performance analysis of DS-CDMA using different chaotic sequences," 2016 International Conference on Wireless Communications, Signal Processing and Networking (WiSPNET), Chennai, 2016, pp. 2421-2425.
Jing Lei and Tung-Sang Ng, "Pilot-tone-based maximum likelihood estimator for carrier frequency offset in OFDM systems," Communications, 2003. ICC '03. IEEE International Conference on, 2003, pp. 2046-2050 vol. 3.
S. J. Lee and J. Ahn, "Acquisition performance improvement by Barker sequence repetition in a preamble for DS-CDMA systems with symbol length spreading codes," in IEEE Transactions on Vehicular Technology, vol. 52, No. 1, pp. 127-131, Jan. 2003.
J. Iinatti, "Matched filter code acquisition of burst and continuous pilot signal in Doppler shift," 11th IEEE international Symposium on Personal Indoor and Mobile Radio Communications. PIMRC 2000. Proceedings (Cat. No. 00TH8525), London, 2000, pp. 1276-1280 vol. 2.
J. Lindenlaub and K. Chen, "Performance of Matched Filter Receivers in Non-Gaussian Noise Environments," in IEEE Transactions on Communication Technology, vol. 13, No. 4, pp. 545-547, Dec. 1965.
J. Low and S. M. Waldstein, "A Direct Sequence Spread-Spectrum Modem for Wideband HF Channels," MILCOM 1982—IEEE Military Communications Conference—Progress in Spread Spectrum Communications, 1982, pp. 29.6-1-29.6-6.
A. Martin, Y. Hasan and R. M. Buehrer, "Physical layer security of hybrid spread spectrum systems," 2013 IEEE Radio and Wireless Symposium, Austin, TX, 2013, pp. 370-372.
A.J. Michaels and D. B. Chester, "Efficient and flexible chaotic communication waveform family," 2010—MILCOM 2010 Military Communications Conference, San Jose, CA, 2010, pp. 1250-1255.
A. J. Michaels and D. B. Chester, "Adaptive correlation techniques for spread spectrum communication systems," MILCOM 2016—2016 IEEE Military Communications Conference, Baltimore, MD, 2016, pp. 678-681.
A. J. Michaels arid C. Lau, "Generalized Multi-carrier Chaotic Shift Keying," 2014 IEEE Military Communications Conference, Baltimore, MD, 2014, pp, 657-662.
A.J. Michaels, "High-Order PSK Signaling (HOPS) Techniques for Low-Power Spread Spectrum Communications," Military Communications Conference (MILCOM) 2017, pp. [submitted].
A. Michaels, "Digital Chaotic Communications," PhD Dissertation, Georgia Institute of Technology, 2009.
A. Michaels, "A maximal entropy digital chaotic circuit," in Circuits and Systems (ISCAS), 2011 IEEE International Symposium on, vol., No., pp. 717-720, May 15-18, 2011.
A. Michaels, "Improved RNS-based PRNGs" in IEEE Military Communications Conference (MILCOM), [submitted], 2017.
A. J. Michaels and C. C. Lau, "Quantization Effects in Digital Chaotic Communication Systems," MILCOM 2013—2013 IEEE Military Communications Conference, San Diego, CA, 2013, pp. 1564-1569.
A. Mpitziopoulos, D. Gavalas, C. Konstantopoulos and G. Pantziou, "A survey on jamming attacks and countermeasures in WSNs," in IEEE Communications Surveys & Tutorials, vol. 11, No. 4, pp. 42-56, Fourth Quarter 2009.
E. E. Petrovsky (2018). "Network scalability comparison of IEEE 802.15.4 and receiver-assigned CDMA," IEEE, 9 total pages.
M. B. Pursley, T. C. Royster and M. Y. Tan, "High-rate direct-sequence spread spectrum," IEEE Military Communications Conference, 2003. MILCOM 2003, pp. 1101-1106 vol. 2.
N. X. Quyen, C. T. Nguyen, P. Barlet-Ros and R. Dojen, "A novel approach to security enhancement of chaotic DSSS systems," 2016 IEEE Sixth International Conference on Communications and Electronics (ICCE), Ha Long, 2016, pp. 471-476.

(56) References Cited

OTHER PUBLICATIONS

S. A. Rabee, B. S. Sharif and S. Sali, "An efficient algorithm for distributed power control in cellular radio systems," Third International Conference on 3G Mobile Communication Technologies, 2002, pp. 123-127.

M. Spellman, "A Comparison between Frequency Hopping and Direct Spread PN as Antijam Techniques," MILCOM 1982—IEEE Military Communications Conference—Progress in Spread Spectrum Communications, 1982, pp. 14.4-1-14.4-6.

M. K. Sust and A. Goiser, "A combinatorial model for the analysis of digital matched filter receivers for direct sequence signals," Global Telecommunications Conference and Exhibition 'Communications Technology for the 1990s and Beyond' (GLOBECOM), 1989. IEEE, Dallas, TX, 1989, pp. 1634-1640 vol. 3.

H. H. Takada and A. Anzaloni, "On Bandwidth Allocation for Demand-Assignment Multiple Access Systems," 2006 International Conference on Communication Technology, Guilin, 2006, pp. 1-4.

F. Tufvesson, S. Gezici and A. F. Molisch, "Ultra-Wideband Communications using Hybrid Matched Filter Correlation Receivers," in IEEE Transactions on Wireless Communications, vol. 5, No. 11, pp. 3119-3129, Nov. 2006.

D. Yan and P. Ho, "Code acquisition in a CDMA system based on Barker sequence and differential detection," in IEEE PIMRC'95, Toronto, ON, Canada, 1995, pp. 233-236.

Young-Hyun Oh and D. J. Thuente, "Enhanced security of random seed DSSS algorithms against seed jamming attacks," 2012 IEEE Global Communications Conference (GLOBECOM), Anaheim, CA, 2012, pp. 801-806.

J. Yu, H. Li, Y. d. Yao and N. J. Vallestero, "LPI and BER Performance of a Chaotic CDMA System," IEEE Vehicular Technology Conference, Montreal, Que., 2006, pp. 1-5.

W. S. Yuan and C. N. Georghiades, "Rapid carrier acquisition from baud-rate samples," in IEEE Transactions on Communications, vol. 47, No. 4, pp. 631-641, Apr. 1999.

A. A. Zaher, "An improved chaotic shift keying technique," *2012 5th International Symposium on Communications, Control and Signal Processing*, Rome, 2012, pp. 1-4.

\* cited by examiner

Asymmetric logic structure for 1-bit multiplications

Exemplary logic implementation for 1-bit multiplications with pruned coefficients.

Comparative preamble detection performance for the correlator model variants.

FALLTHROUGH CORRELATION TECHNIQUES FOR ARBITRARY-PHASE SPREAD SPECTRUM WAVEFORMS

CROSS-REFERENCE TO RELATED APPLICATIONS

This application claims priority to and the benefit of U.S. Provisional Patent Application No. 62/553,039, entitled HIGH-ORDER PSK SIGNALING (HOPS) TECHNIQUES FOR LOW-POWER SPREAD SPECTRUM COMMUNICATIONS, filed Aug. 31, 2017, and U.S. Provisional Patent Application No. 62/553,035, entitled FALLTHROUGH CORRELATION TECHNIQUES FOR ARBITRARY-PHASE SPREAD SPECTRUM WAVEFORMS, filed Aug. 31, 2017, the disclosures of each of which are hereby incorporated by reference in their entirety for all purposes. This application is related to U.S. application Ser. No. 16/119,763, entitled HIGH-ORDER PSK SIGNALING (HOPS) TECHNIQUES FOR LOW-POWER SPREAD SPECTRUM COMMUNICATIONS, filed on even date herewith, and to U.S. application Ser. No. 16/119,772, entitled HIGH-ORDER PSK SIGNALING (HOPS) TECHNIQUES FOR LOW-POWER SPREAD SPECTRUM COMMUNICATIONS, filed on even date herewith, the disclosures of each of which are hereby incorporated by reference in their entirety for all purposes.

BACKGROUND

Designing burst-mode wireless communication systems often presents additional challenges over that of a standard continuous data link, in particular due to the need to re-acquire the signal on a burst-by-burst basis. In low-power devices such as those suitable for Internet of Things (IoT), distributed sensing, or battery powered personal communications devices, burst-mode waveforms traditionally employ techniques to make the acquisition preamble as easy to receive as possible, typically by embedding pilot tones, repeated cyclic prefixes, cyclic autocorrelation functions, soft-handoff between spreading codes, Barker-sequence I short preamble repetition, maximal-likelihood estimation, and/or variations of matched filter techniques. Virtually all of these approaches rely on an inherent cyclostationary signal feature of the signal's preamble, which compromises the security of the signal; further, most all of the techniques are computationally intensive, making them difficult to implement in a generalized fashion in an IoT-caliber low-power device.

Spread spectrum waveforms designed for increased security fundamentally try to minimize cyclostationary signal content, since including it eases blind detection and/or exploitation by an unintended receiver. Reception of these signals is therefore further complicated, leading to methods for soft synchronization, methods to counteract estimated channel effects, adaptive offline correlation techniques, and related-time-based synchronization techniques. Each of those techniques adapts some aspect of the matched-filter/coherent receiver processing architectures for specific waveforms and/or use cases, most of which are non-repeating spreading codes designed to lessen cyclostationary content.

SUMMARY

Disclosed herein are computational efficiency improvements for a generic coherent matched filter receiver architecture, starting with a traditional brute-force matched filter design and subsequently presenting lower-power and/or lower computation methods suitable to Internet of Things (IoT) devices to achieve the same purpose. Enhancements for reduced precision correlation calculations, optimally pruned correlations, variable length correlations are all considered, offering simpler methods for low-power IoT asynchronous reception, underlay-based watermark validation, and receiver-assigned multiple access operations. The disclosed correlation architectures may be efficiently and compactly implemented to process, with minimal performance degradation, non-repeating arbitrary phase waveforms with optional chip amplitude shaping. The use of such signals optionally eliminates the possibility for any burst-to-burst learning or acquisition aides, which is advantageous for use in, for example, IoT-caliber devices required to operate relatively securely.

In one aspect, disclosed herein is a correlation apparatus including a sequence generator configured to generate a non-repeating preamble sequence which changes during each of a plurality of time epochs. The correlation apparatus includes a fallthrough correlator having a tapped delay line for receiving a set of complex-valued samples of a received signal. Each of a plurality of taps of the tapped delay line is separated by one of a corresponding plurality of delay elements. The correlation apparatus further includes a plurality of complex multipliers. Each of the plurality of complex multipliers is coupled to one of the plurality of taps. Each complex multiplier is configured to multiply, during one of the plurality of time epochs, at least one of the complex-valued samples of the received signal by one of a plurality of matched filter coefficients where the matched filter coefficients correspond to values of the preamble sequence. A summation module includes a plurality of adders where each of the adders includes a first input coupled to an output of one of the complex multipliers and a second input coupled to an output of another of the adders. A last of the plurality of adders is configured to output a correlation signal. In one implementation a peak value of the correlation signals exceeds a threshold value when a sufficient correlation exists between the set of complex-valued samples of the received signal and the values of the preamble sequence.

The correlation apparatus may be further configured to use a magnitude of the peak value to estimate a power level of the received signal and to dynamically vary a length of the preamble sequence or the detection threshold based on the estimate of the power level of the received signal.

In one implementation each the plurality of complex multipliers are implemented as a corresponding plurality of sign-selected adder trees. Further, each of the plurality of sign-selected adder trees may include plural induced sign flip multiplication modules, a sign-cognizant barrel shifter, and plural adders.

The correlation apparatus may also be responsive to a pruning control signal to dynamically reduce a number of the plurality of matched filter coefficients by dynamically reducing a number of the plurality of complex valued multipliers used to multiply the complex-valued samples of the received signal. In some such cases, the number of complex valued multipliers may be fixed, with the selection of which delay taps are configured being chosen to maximize the expected correlation value of the desired signal.

In one implementation the fallthrough correlator is configured to operate using at least one of exclusively asynchronous digital logic and analog delay lines. In addition, each of the plurality of complex multipliers may be implemented with at least one of: (i) a reduced precision relative to a precision of the samples of the received signal and (ii) one-bit precision.

In instances in which the signal received by the correlation apparatus contains a series of signal bursts, the fallthrough correlator may be further configured to use the correlation signal to determine at least one of frequency offsets and precision timing of ones of the signal bursts.

The disclosure also pertains to a method for correlating a sampled version of a received signal with a non-repeating preamble sequence. The method includes generating the non-repeating preamble sequence wherein the non-repeating preamble sequence changes during each of a plurality of time epochs. A set of complex-valued samples of the received signal is received using a tapped delay line wherein the tapped delay line includes a plurality of taps and wherein each of the plurality of taps is separated by one of a corresponding plurality of delay elements. For each of the complex-valued samples of the received signal, a complex multiplication is performed by multiplying the complex-valued sample of the received signal by one of a plurality of matched filter coefficients using one of a plurality of complex multipliers wherein the plurality of matched filter coefficients correspond to values of the preamble sequence during one of the plurality of time epochs. The method further includes summing results of the complex multiplications to provide a correlation signal wherein a peak value of the correlation signal exceeds a threshold value when a sufficient correlation exists between the set of complex-valued samples of the received signal and the values of the preamble sequence.

The method may further include using a magnitude of the peak value to estimate a power level of the received signal. In addition, the method may also include dynamically varying a length of the preamble sequence or changing the adaptive correlation threshold based on the estimate of the power level of the received signal.

In another aspect, the method includes dynamically reducing a number of the plurality of matched filter coefficients by dynamically reducing a number of the plurality of complex valued multipliers used to multiply the complex-valued samples of the received signal.

The method may also include performing each of the complex multiplications using asynchronous digital logic.

In instances in which the received signal contains a series of signal bursts, the method may further include using the series of correlation values to determine at least one of frequency offsets and precision timing of ones of the signal bursts.

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
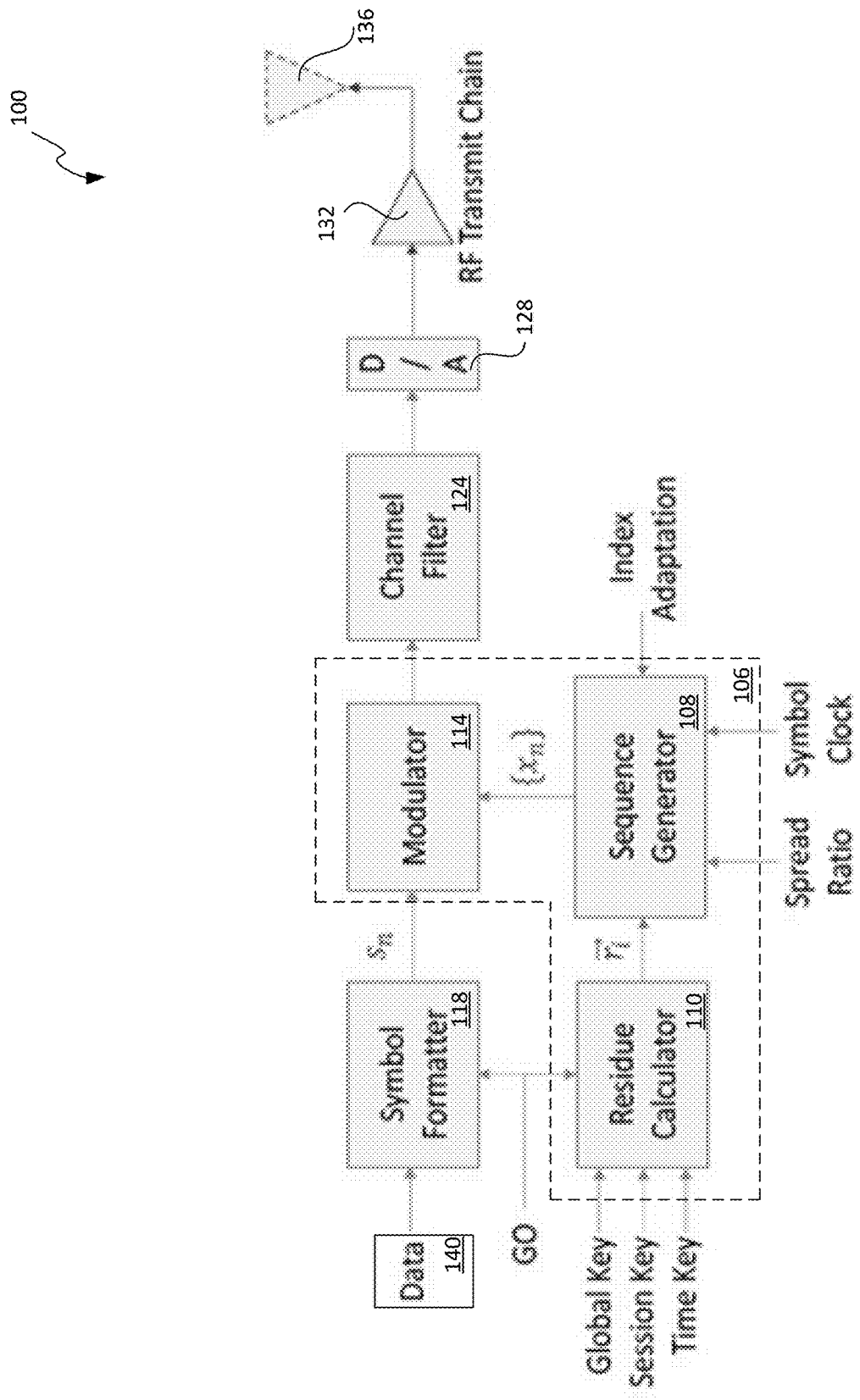
FIG. 1 provides a block diagrammatic illustration of an embodiment of a HOPS transmitter configured to produce a HOPS signal using low-power generation techniques.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common, but well-understood, elements that are useful or necessary in a commercially feasible embodiment are often not depicted in order to facilitate a less obstructed view of these various embodiments of the present disclosure.

DETAILED DESCRIPTION

The use of practically non-repeating spreading codes to generate sequence based spread spectrum waveforms is a strong method to improve the signal's security by limiting an observer's opportunity to cross-correlate snapshots of the signal into a coherent gain. Such time-varying codes, particularly when used to define multi-bit resolution arbitrary phase waveforms, present significant challenges to the intended receiver, which must synchronize their receiver processing to match the time-varying code every time it changes. Disclosed herein are a series of options for optimizing the canonical brute-force matched filter preamble correlator for burst-mode arbitrary phase spread spectrum signals, achieving significant computational gains and flexibility, while also offering measurable results from a hardware prototype built on an FPGA. Extensions of the core fallthrough correlator technique are also presented to support lower-power asynchronous processing, underlay watermark validation for PHY-layer firewall functions, and receiver-assigned multiple access CDMA protocols.

As is discussed below, embodiments of the disclosed fallthrough correlator enable novel computational efficiency improvements to be made to a matched filter signal detector in which the coefficients of the matched filter change on a burst-by burst basis. Although the time-based evolution of the matched filter coefficients provides enhanced security, such time-based coefficient variation effectively eliminates many of the standard methods for pruning coefficient widths and/or collapsing the correlation structure to take advantage of a priori known cyclostationary features in the burst preambles. The arbitrary phase nature of chaotic sequence spread spectrum (CSSS) or high-order PSK signaling (HOPS) signals also presents challenges for collapsing the complex-valued correlations (multiplications) into digital logic using the same methods typically employed for direct sequence spread spectrum (DSSS) signals, which usually only employ 2-ary or 4-ary chip phases. Similar analyses previously evaluated the use in reduced-computation processing of semi coherent chaotic carrier shift keying waveforms, yet there, the timing and phase are effectively coherent.

As a consequence, embodiments of the optimized fallthrough correlator design presented herein incorporate various structural and computational enhancements which enable compact hardware implementations with minimal performance degradation even when used in systems in which matched filter coefficients change on a burst-by-burst basis and arbitrary phase CSSS or HOPS signals are employed.

In order to provide an appropriate context for describing the novel fallthrough correlation apparatus, an exemplary communication system including a HOPS transmitter and a HOPS receiver including a fallthrough correlation module is initially described. Details of exemplary embodiments of the fallthrough correlator apparatus suitable for inclusion within a HOPS receiver are then presented.

HOPS System Overview

Described herein are embodiments of a HOPS modulation system and technique capable of supporting short low-power bursts of communication signals that each convey small amounts of data. Such capabilities are useful in, for example, systems including multiple sensors which change infrequently, leading to low duty cycle bursts. The individual data payloads associated with such sensors also tend to be small, bounded in many cases by 256 bits apiece. The large number of nodes and low data rates in such sensor systems are conducive to a code division multiple access (CDMA) based channel sharing using sequence-based spread spectrum techniques. Rather than sticking to traditional binary/quadrature-phase DSSS waveforms, embodiments of the HOPS spread spectrum links take advantage of the spectral compactness and security benefits arising from arbitrary phase PSK signaling techniques. As a burst waveform construct, each HOPS signal may be viewed as a vector of metadata-driven burst parameters coupled with a variable-length data payload. Those parameters may be modified burst-to-burst, enabling dynamic properties like different destinations, performing code-hopping or frequency-hopping, or changing modulation characteristics. This burst structure also enables batch-style processing, whereby messages share a common transmission process and can be performed in real-time or (for non-latency critical applications) implemented in an offline style processing that minimizes total power.

Reception of the signal follows that of most sequence-based spread spectrum systems, modified to use a novel single-shot fallthrough correlator as the signal detector. Any number of independent demodulator chains may be incorporated, with each having independent DC bias/wake up controls, as a mechanism to scale multiple access performance.

The disclosure begins with an overview of the HOPS system model, focusing on the synthesis of techniques for sequence generation, modulation, and synchronization, while also highlighting aspects of exemplary hardware implementations. As is discussed below, the HOPS system model provides added controls for signal dynamics (code-hopping, time-hopping, and frequency-hopping) via use of a constantly cycling residue number system (RNS)-based sequence generator framework. The extensions of this HOPS system model towards optimizations for data aggregation within IoT-style hierarchical networks, minimizing end-to-end latency, and adaptive data rates are also discussed herein.

Attention is now directed to FIG. 1, which provides a block diagrammatic illustration of an embodiment of an embodiment of a HOPS transmitter 100 configured to produce a HOPS signal using low-power generation techniques. Embodiments of the transmitter 100 enable generation of HOPS signals having time-evolving signal dynamics via use of a constantly cycling residue number system (RNS)-based sequence generator. Although not shown in FIG. 1, the HOPS transmitter 100 may be utilized in systems and networks including multiple other HOPS transmitters and multiple HOPS receivers.

As shown in FIG. 1, the HOPS transmitter 100 includes a spread spectrum modulator 106 having a sequence generator 108 configured in response to residue vectors produced by a seed calculator, which in the embodiment of FIG. 1 is implemented as an RNS calculator 110. It may be appreciated that in other embodiments, the seed calculator and spread spectrum modulator may be realized using other pseudorandom number generators (PRNGs). The spread spectrum modulator 106 further includes a modulator element 114 operative to spread an encoded or non-encoded data signal received from a symbol formatter 118 with an optionally non-repeating spreading sequence produced by the sequence generator 108. During operation of the transmitter 100, the residue calculator 110 provides the sequence generator 108 a series of unique residue vectors calculated based upon a set of time-evolving values of a plurality of keys. In one embodiment, the plurality of keys include a global key, a session key and a time key or counter, which is incremented every system time epoch (e.g., every 1 second). This time evolution of the key values provided to the residue calculator 110 results in a different residue vector being calculated by the residue calculator 110 every time epoch and thus a different corresponding spreading sequence being generated by the sequence generator 108 each time epoch. The transmitter 100 also includes a channel filter 124 coupled to an output of the modulator element 114, a digital to analog (D/A) subsystem 128, an RF transmit subsystem 132, and an antenna 136.

Data source 140 may be implemented as an interface though which an externally-provided input signal is received. During operation of the transmitter 100, data source 140 may supply bits of data to the symbol formatter 118 at a specified data rate.

The symbol formatter 118 may conventionally encode the data provided by the data source 140 and format the encoded data into symbols. For example, the encoded data may be formatted into phase shift keyed (PSK) symbols (e.g., QPSK symbols). The symbol formatter 118 may also include conventional sample rate matching structures so that a sample rate of the PSK symbol data matches that of an arbitrary-phase spreading sequence generated by the sequence generator 108 in the manner described hereinafter. Likewise, the symbol formatter 118 may also include conventional pulse shape filtering structures so that inter-symbol interference is managed.

The modulator element 114 includes one or more complex multipliers operative to perform complex-valued digital multiplication operations using the formatted digital symbol data from the symbol formatter 118 and the non-repeating, arbitrary-phase spreading sequence provided by the sequence generator 108. The output of the complex multiplier yields a discrete-time discrete-amplitude baseband or intermediate frequency (IF) signal, which may be characterized as an arbitrary-phase PSK signal. Without limitation, the channel filter 124 may optionally be used to perform functions to interpolate the signal, reduce inter-chip interference, and/or resample the signal.

Within the DIA subsystem 128, the spread spectrum arbitrary-phase PSK signal may be conventionally interpolated, converted to analog form using a digital to analog converter (DAC), and upconverted in frequency to an RF signal. The RF transmit subsystem 132 may then amplify and transmit the RF signals as a spread spectrum communication signal using the antenna 136.

Figure 2:
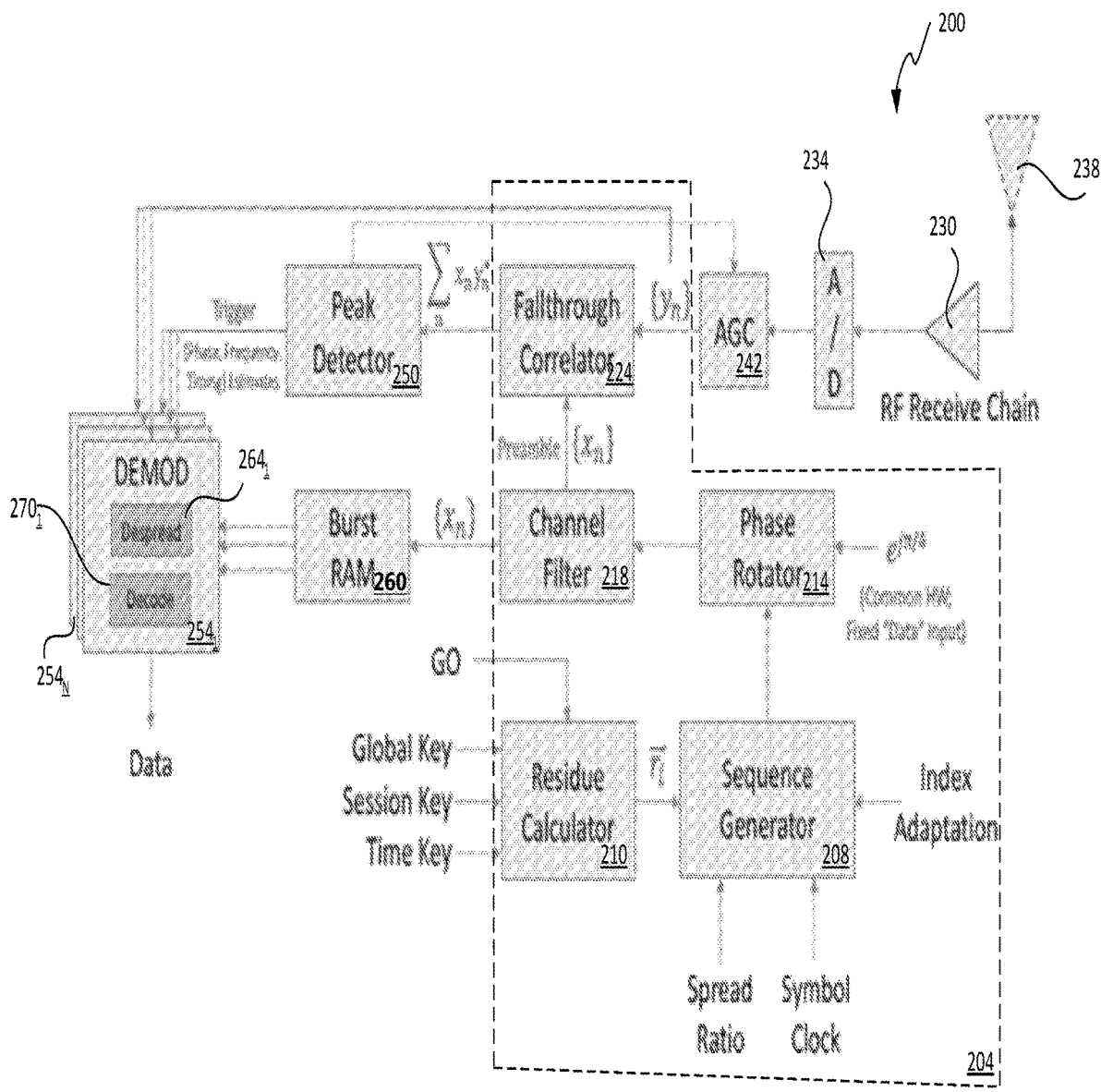
FIG. 2 provides a block diagrammatic illustration of an embodiment of an embodiment of a HOPS receiver.

Attention is now directed to FIG. 2, which provides a block diagrammatic illustration of an embodiment of an embodiment of a HOPS receiver 200. As shown, the receiver 200 includes a correlation apparatus 204 having a sequence generator 208 essentially identical to the sequence generator 108 within the transmitter 100. The correlation apparatus 204 further includes a seed calculator implemented as a residue calculator 210 substantially identical to the residue calculator 110 within the transmitter 100.

During operation of the receiver 200, the residue calculator 210 provides the sequence generator 208 a series of unique residue vectors calculated based upon a set of time-evolving values of the same keys (e.g., a global key, a session key and time key or counter) provided to the spread spectrum modulator 106 of the transmitter 100. Again, the time evolution of the key values provided to the residue calculator 210 results in a different residue vector being calculated by the residue calculator 210 each time epoch and thus a different corresponding spreading sequence being generated by the sequence generator 208 each time epoch. The spreading sequence, i.e., preamble, generated by the sequence generator 208 is rotated in phase by a phase rotator 214 and filtered by a channel filter 218 prior to being provided to a fallthrough correlator 224, which is described hereinafter. While this embodiment shown in FIG. 2 employs the fallthrough correlator 224, note that traditional direct sequence spread spectrum processing techniques may be employed without limitation.

The receiver 200 also includes an RF receive chain 230 and an analog to digital (AID) converter unit 234. After being received by antenna 238 of receiver 200, the spread spectrum communication signal communicated from the transmitter 100 is provided to the RF receive chain 230 in which it may be conventionally amplified, downconverted in frequency to an IF. The IF signal from the receive chain 230 may then be filtered and converted to a digital signal using the AID converter unit 234. An automatic gain control (AGC) circuit 242 may adjust the gain of the received signal before passing to the fallthrough correlator 224.

During operation of the receiver 200, the fallthrough correlator 224 is configured to produce a series of correlation values by correlating samples of the received signal and samples of the preamble sequences internally generated by the sequence generator 208. In this way, the fallthrough correlator 224 is used to discriminate the presence of an incoming signal preamble (or other known signal content). A peak detector 250 operates to generate a trigger signal upon determining that at least one of the correlation values exceeds a threshold value, thereby determining the timing of the incoming signal preamble.

The trigger signal is used to select one of N demodulator chains 254 for demodulating simultaneously received images of the received signal (e.g., multipath) in order to recover data values carried thereby or to receive multiple independently transmitted signals from different transmitters. Reception of other multipath images and/or independently transmitted signals of one or more received signals results in generation of additional trigger signals and selection of other of the N demodulator chains 254. The preamble sequence stored within a burst RAM module 260 when a given trigger signal is generated corresponds to the sequence used by the fallthrough correlator to produce the correlation value giving rise to the trigger signal. Accordingly, the time-aligned preamble sequence within the burst RAM module 260 is used by a despreading module 264 of the selected demodulator chain 254 for despreading of the received signal. The despreading module 264 may include an accumulate & dump circuit or the equivalent that assists with translation from despread spread spectrum chips into data symbols. During steady state operation of the receiver 200, the output produced by despreading module 264 corresponds to "soft decisions" of PSK symbols. These PSK soft decisions may be provided to a decoder module 270, which is configured to render final decisions with respect to each soft decision and thereby produce a recovered symbol stream. The recovered symbol stream may then be conventionally decoded into recovered data corresponding to an estimate of the input data provided by the data source 140. Although not shown, traditional mechanisms for data frame verification like cyclic redundancy checks (CRC) or forward error correction (FEC) processing may be inserted into the processing of the decoder module 270 to improve error rate performance.

Although the receiver 200 is not illustrated as having RAKE receiver capabilities, i.e., the capability to combine multipath images to create a larger single effective signal, the fallthrough correlator could be utilized in such RAKE receiver systems. In this context pulse trains, each of which is above a chosen detector threshold, could be used to indicate to the subsequent parallel demodulators 254 that the signals may be multipath images and therefore could combined to improve a single signal.

Figure 3:
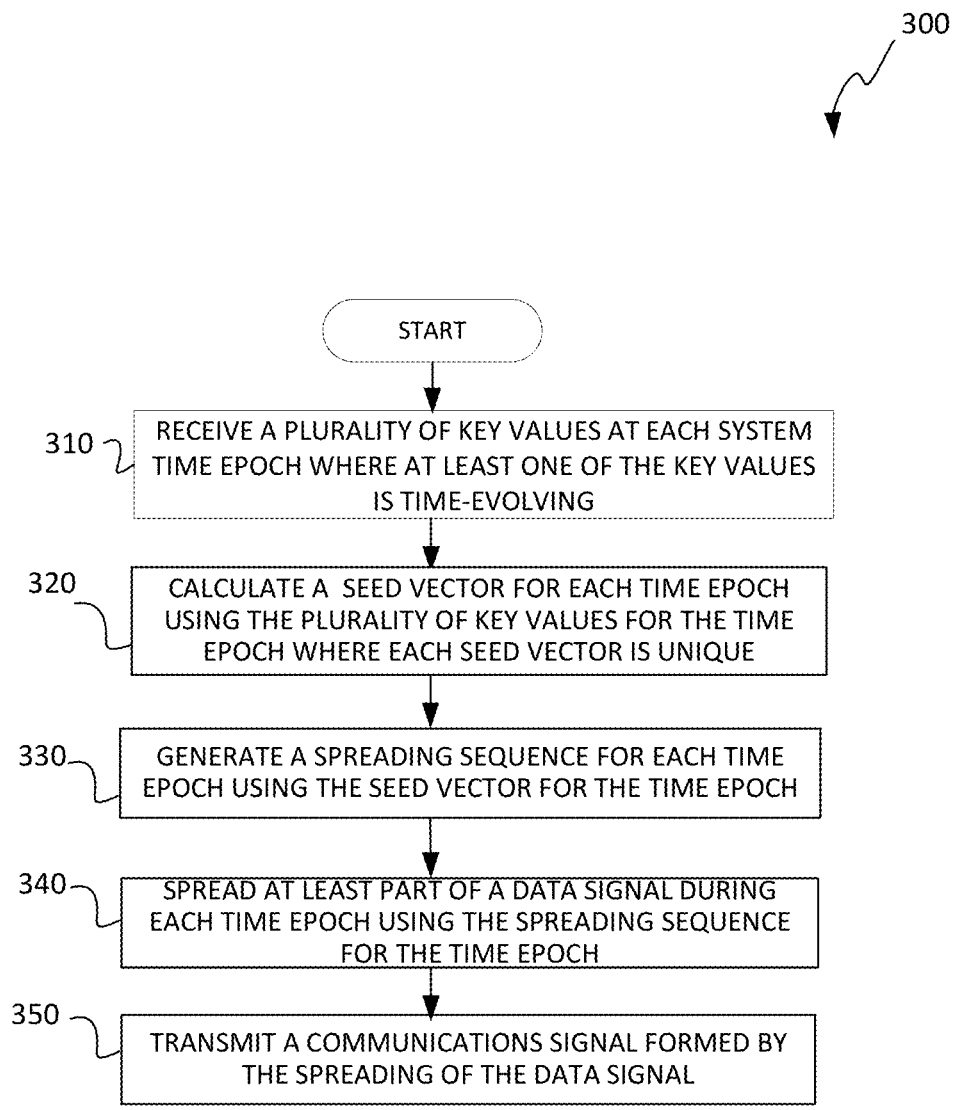
FIG. 3 is a flowchart illustrating an exemplary process for HOPS signal generation and transmission.

Turning now to FIG. 3, a flowchart is provided which illustrates an exemplary process 300 for HOPS signal generation and transmission. As shown, the process 300 includes receiving a plurality of key values at each system time epoch where at least one of the key values evolves over time (stage 310). A seed vector is calculated for each time epoch using the received key values, where each seed vector is unique (stage 320). A spreading sequence is generated for each time epoch using the seed vector for the time epoch (stage 330). The process 300 further includes spreading at least part of a data signal during each time epoch using the spreading sequence for the time epoch (stage 340). A communications signal formed by the spreading of the data signal may then be transmitted (stage 350).

Figure 4:
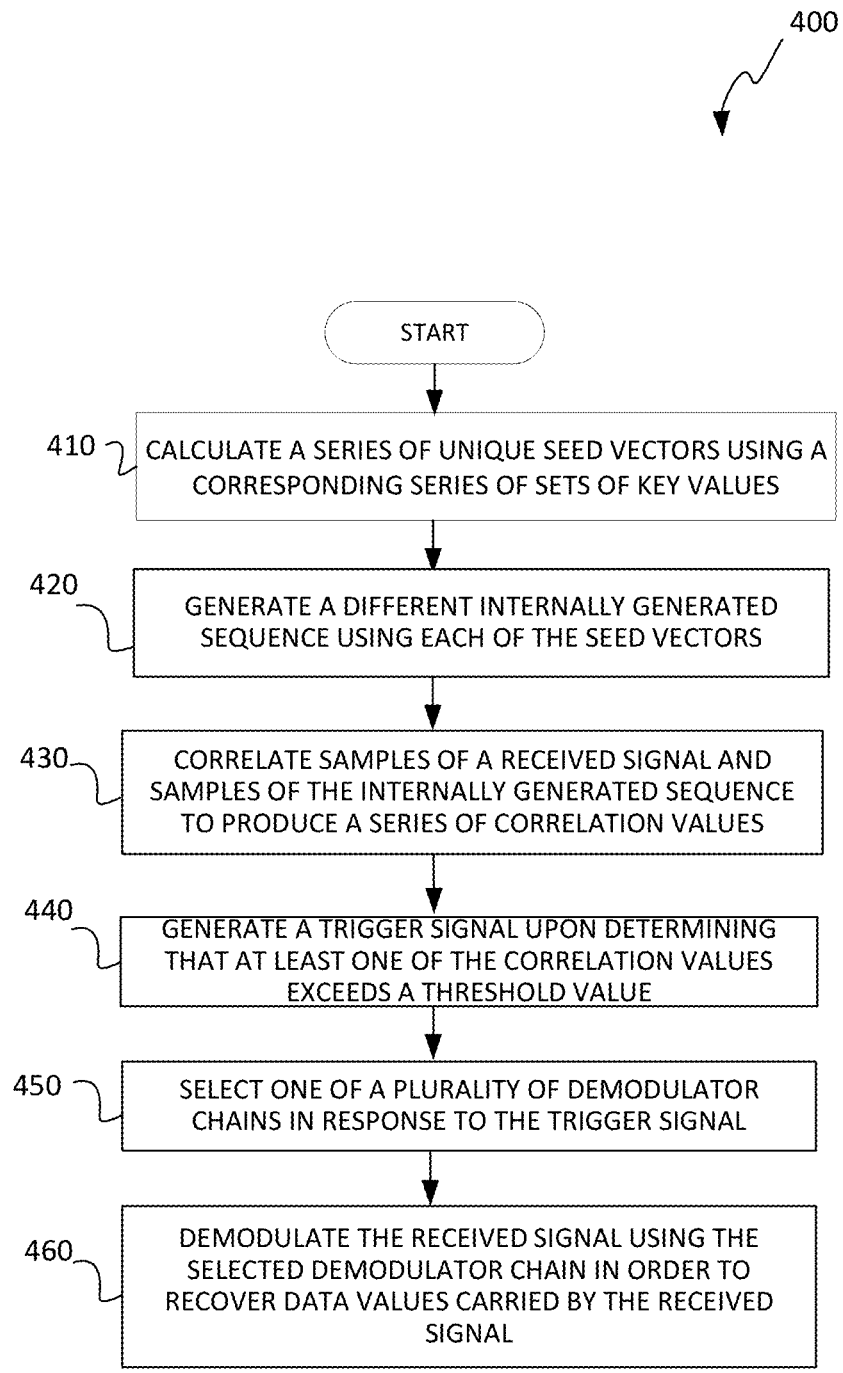
FIG. 4 is a flowchart illustrating an exemplary process for receiving, demodulating and decoding a HOPS signal in accordance with the disclosure.

FIG. 4 is a flowchart illustrating an exemplary process 400 for receiving, demodulating and decoding a HOPS signal in accordance with the disclosure. The process 400 includes calculating a series of unique seed vectors using a corresponding series of sets of key values (stage 410). In one embodiment the series of unique seed vectors are manifested as a series of residue vectors produced using a residue calculator in response to the sets of key values, each of which is included within an RNS. A different internally generated sequence is then generated using each successive seed vector (stage 420). Samples of a received signal and samples of the internally generated sequence are then correlated to produce a series of correlation values (stage 430). A trigger signal is generated upon determining that at least one of the correlation values exceeds a threshold value (stage 440). In response to the trigger signal, one of a plurality of demodulator chains is selected (stage 450). The selected demodulator chain then demodulates the received signal using the internally generated preamble sequence responsible for initiating generation of the trigger signal, thereby enabling recovery of data values carried by the received signal (stage 460).

Additional details relating to the overall HOPS system structure depicted in FIGS. 1 and 2 are provided below. In particular, a description is provided of embodiments of a burst-mode sequence generation engine utilized by the sequence generators 108, 208 and associated residue calculators 110, 210, the synchronization between transmitter 100 and receiver 200, network topology considerations, and multiple access scalability.

At the core of embodiments of the HOPS baseband signal processing is an RNS-based sequence generation engine that supports real-time burst mode operation. Assuming an RNS consisting of n prime characteristic ($p_i$) residue spaces, with an overall dynamic range of $M = \Pi_{i=1}^{n} p_i$, the sequence generator accepts a vector of distinct residues $\vec{r_i}$ at the beginning of the burst to define the initial conditions of that burst's sequence. Given the computationally efficient googol-year style sequences that may be generated, the key characteristic to non-repeatability is to ensure that the inserted indexes are not repeated or overlap. As configured, the residue vectors for each burst supports the addition of three distinct keys, each in RNS format (all values in the vector format satisfy $0 \leq r_i < p_i$, representative of a global key $\vec{r_G}$ (shared by all nodes in the network), a session key $\vec{r_S}$ (shared by all nodes in the subnet), and a time-based counter $r_T$ (constantly updating). These residue components are directly added together and reduce modulo the prime values to get the initial index values for that burst.

$$\text{InitialResidues} = \vec{r_i} = (\vec{r_G} + \vec{r_S}) \bmod \vec{p_i}, \quad (1)$$

One alternate interpretation of these keys is that the session key represents the address of the intended recipient, whereby the total googol-length sequence may be subdivided into distinct user code spaces. It should be noted however that the selection of three distinct keys is arbitrary—any number of distinct keys (≥1) may be inserted in order to define the use of the maximal length code space. Moreover, the refresh period between updates of the key(s) (an individual time "epoch") is a configurable system design parameter for the network. As a practical compromise between security and complexity, in one embodiment the time epoch is taken to be on the order of 1 second, although employing a ping-pong structure between two fallthrough correlators (reasonable for DC-powered nodes) enables timing epochs on the order of 1 ms. Since the spreading code produced by the sequence generators 108, 208 rolls over at each time epoch, each preamble targeted at the beginning of new time epochs is also unique. The important characteristic is to choose those values in a way that keys may not repeat due to different assignments.

Figure 5:
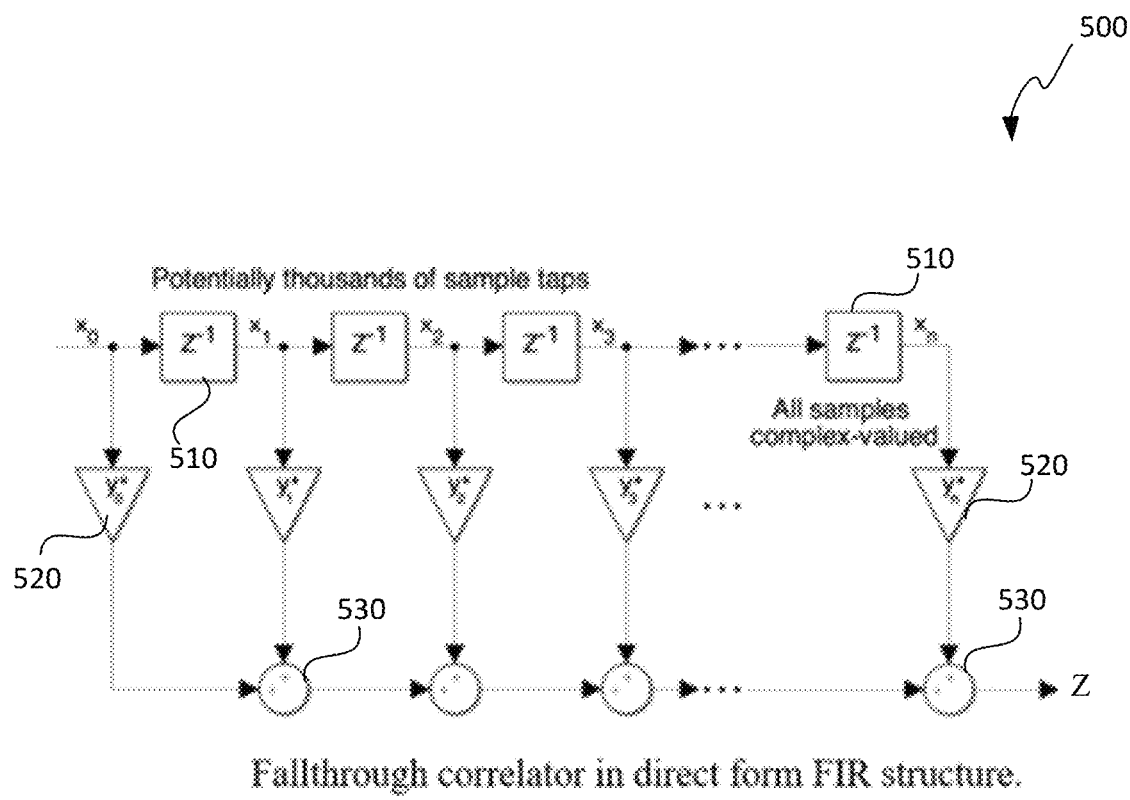
FIG. 5 is a simplified representation of a fallthrough correlator in direct form finite impulse response (FIR) structure.

Overview of Fallthrough Correlator Structure for Arbitrary-Phase Spread Spectrum Signals Attention is now directed to FIG. 5, which is a simplified representation of a fallthrough correlator 500 in direct form finite impulse response (FIR) structure. As may be appreciated, the multi-bit resolution preamble sequences of arbitrary-phase spread spectrum waveforms require correlations with dedicated hardware multipliers, demanding a larger overall correlator structure than that of DSSS signals. At each time epoch, the fallthrough correlator 500 must register a new sequence of matched-filter coefficients so that they are in place and ready for correlation processing when the next signal arrives.

As shown in FIG. 5, $x_0, x_1, \ldots, x_n$ form a series of received signal samples separated by delay elements 510, and $y_0, y_1, \ldots, y_n$ are the internally generated matched-filter coefficients associated with complex multipliers 520. The correlator 500 further includes a summation network including a plurality of adders 530. The output response Z of the model correlator 500 is computed as:

$$Z = \sum_n x_n y_n^*$$

where "*" refers to a complex-valued conjugation of the coefficient.

Although this computation is similar to that performed by a direct-form finite impulse response (FIR) filter, the conventional approaches to improving the implementation of the correlator 500 of FIG. 5 are generally inapplicable in the context of a HOPS system. In particular, with conventional FIR filters significant improvements may typically be made (1) due to symmetry of wisely chosen coefficients (pre-additions), (2) by elimination of sufficiently small/zero coefficients (pruning), (3) by canonic signed digit (CSD) mapping of static coefficients to shift-adds, (4) by employing computationally efficient multi-rate processing structures, and (5) by variable control of the coefficient word widths. The time-based evolution of the matched-filter coefficients in the present HOPS system eliminates many of the traditional simplifications. For example, (1) the correlation of a preamble without any cyclostationary features can not have easily exploitable symmetries, (2) coefficients may be pruned, although the correlator taps generally contribute a similar amount of energy to the composite correlation value, (3) canonic signed digit (CSD) mappings may also be applied, but must be dynamically addressable with variable barrel shifters, (4) the sample rate is notionally fixed, so no multi-rate signal processing, and (5) in hardware, the coefficient word width will need to support the largest dynamic range that the coefficient may ever be.

In addition to these distinctions from a standard FIR filter, it is noted that embodiments of the fallthrough correlator 500 do not store any received signal values in memory beyond the displayed delay line taps. That is, if a signal is not detected when it arrives, it is effectively dropped. Upon preamble detection, correlator logic may provide a signal power estimate prior to despreader processing. Under the assumption of normalized inputs, the square-law detector 250 ideally triggers to a correlation peak with magnitude equal to the product of the average chip energy and the length of the correlation. The internally generated (coherent) signal produced by the sequence generator 208 is trivial to normalize, although the incoming receive signal is variable and highly dependent on any system gains occurring prior to the correlator 224. As such, the magnitude of the resulting correlation peak(s) may be used to estimate the power level of the incoming signal and/or its multipath components. This is particularly important for spread spectrum systems, since the signal often operates at or below the ambient noise floor of the receiver 200. Given an adaptive detection threshold T, the signal power estimate is used to improve the detection statistic of subsequent preambles evaluated accordingly:

$$\text{Peak} = \left| \sum_n x_n y_n^* \right| \geq T$$

Another distinction is that of phase rotations, with particular focus on center frequency offsets. The static phase rotation may be detected (referenced to the center of the correlation window) from the phase of the correlation peak (s) and subsequently corrected prior to despreading. Frequency offset requires comparison of multiple sub-correlation values through the large correlator structure so that measured phase rotations as a function of time may be translated, via the known sample rate, to an instantaneous frequency offset applied to the remainder of the pulse. If the frequency offset causes the correlation values to drift more than $\approx \pi/2$ radians over the duration of the preamble, then the integration process underlying the addition of the taps will begin to fail. The final distinction of timing uncertainty due to phase noise or oscillator drift is not supported by this FIR structure, although practical clocks (<100 ppm) deployed in commercially relevant contexts will tend not to drift substantially beyond that which is supported, and preamble detections of subsequent preambles will have unique starting sample points, making only the short-term stability relevant.

Selected Computational Enhancements

Adapting these observations to an IoT-relevant context, one goal is to be able to achieve reasonably solid performance from a minimum amount of hardware. In particular, choosing methods to boost the detection performance of the preamble may be preferable to increasing the hardware employed by a low power device. The recognition that most IoT networks are focused on disaggregation of a large number of low-power nodes, each having small amounts of data to send, leads to a correlator structure that may be optimized for multiple access performance rather than nodes attempting to avoid detection or make "optimal" use of the channel capacity. Further, the correlation processing of nodes needs not be symmetric—devices having access to prime power may choose to implement a larger and/or more precise correlator than a battery-powered node, even though they receive the identical signal. These observations, and the anticipation that the link will operate at or above the noise floor, lead to the series of identified improvements that may be incorporated into embodiments of the fallthrough correlator 500.

Dynamic Preamble Lengths

The length of the internally generated preamble sequence provided by the sequence generator 208 may be allowed to vary dynamically based on the measured power of the received signal. With the general goal of obtaining a detection statistic on the order of +17-21 dB SNR for burst detection, the length of the preamble may be shortened to improve link efficiency in a non-low-power system, or longer to improve detection probabilities. Shorter preambles have more difficulty in estimating phase rotation and/or frequency offsets, placing a practical minimum bound on the order of 2-4 symbols, independent of SNR. In hardware prototypes of the HOPS system, an 8-symbol BPSK preamble was employed, effectively offering a 12 dB advantage (3 dB from BPSK vs. QPSK, and 9 dB for integration over 8 symbols) over the QPSK-modulated data payload.

Truncated Coefficients

Figure 6:
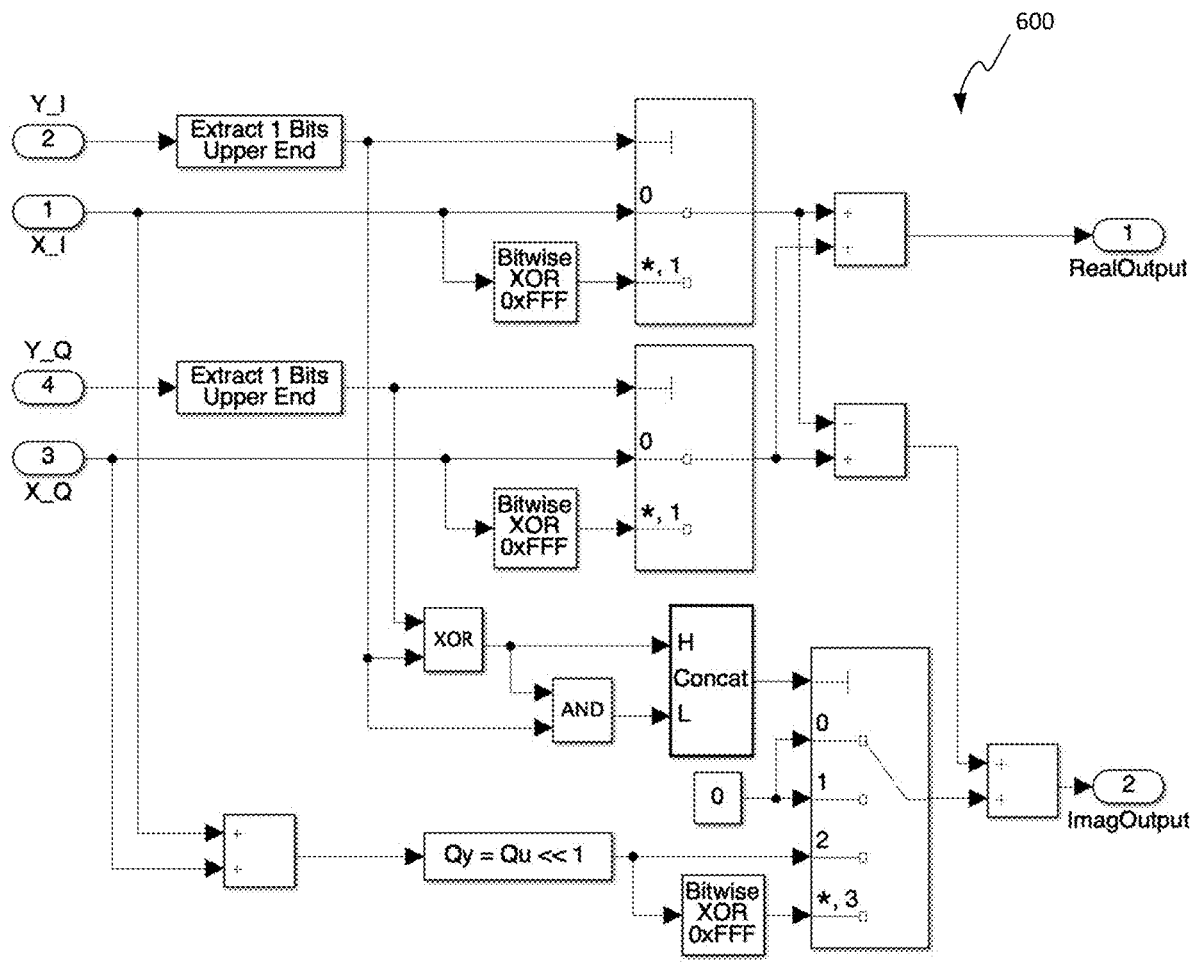
FIG. 6 illustrates an exemplary complex multiplier apparatus configured to implement a three real-multiplier reduction of a truncated coefficient complex multiplication.

Turning now to FIG. 6, an illustration is provided of an exemplary complex multiplier apparatus 600 configured to implement a one-bit three real-multiplier reduction of a complex multiplication and thereby incorporate coefficient truncation in accordance with the disclosure. It has been found that the precision of the matched-filter coefficients can acceptably be reduced, even for arbitrary-phase waveforms. Specifically, it has been determined that the multi-bit resolution phase words may be truncated to 1-bit complex-valued coefficients without any significant detection loss. This may be understood by considering a brute-force correlator that implements the three real-multiplier reduction of z, a complex multiplication:

$$z = (x_I + jx_Q)(y_I - jy_Q)$$

$$z = (x_I y_I + x_Q y_Q) + j((x_I + x_Q)(y_I - y_Q) - x_I y_I + x_Q y_Q)$$

At 1-bit in each of I and Q, this structure may be implemented as two $\{y_I, y_Q\}$-induced sign flip "multiplications," one sign-cognizant barrel shifter, and four adders as shown in FIG. 6. Choosing ones-complement negation in lieu of twos-complement also saves gates without impacting performance appreciably. Given a simulated performance loss of 1.05 dB, the transformation of complex multipliers to sign-selected adder trees is generally a very reasonable trade.

Such truncation must account for the full processing chain of the transmitted signal, including any interpolation, prior to transmission. Additionally, other calculations dependent on the correlator outputs should consider the gain and/or distortion effects of truncated coefficients. Since in exemplary embodiments the overall HOPS waveform is constant envelope (i.e. $x_I^2 + x_Q^2 = 1 \forall$ spreading chips x), the overall correlator output with 1-bit coefficients has gain:

$$\frac{1}{N} \sum_n (|x_{nI}| + |x_{nQ}|) \rightarrow \frac{4}{\pi}$$

where N is the length of the correlation.

Dynamically Pruned Coefficients

Figure 7:
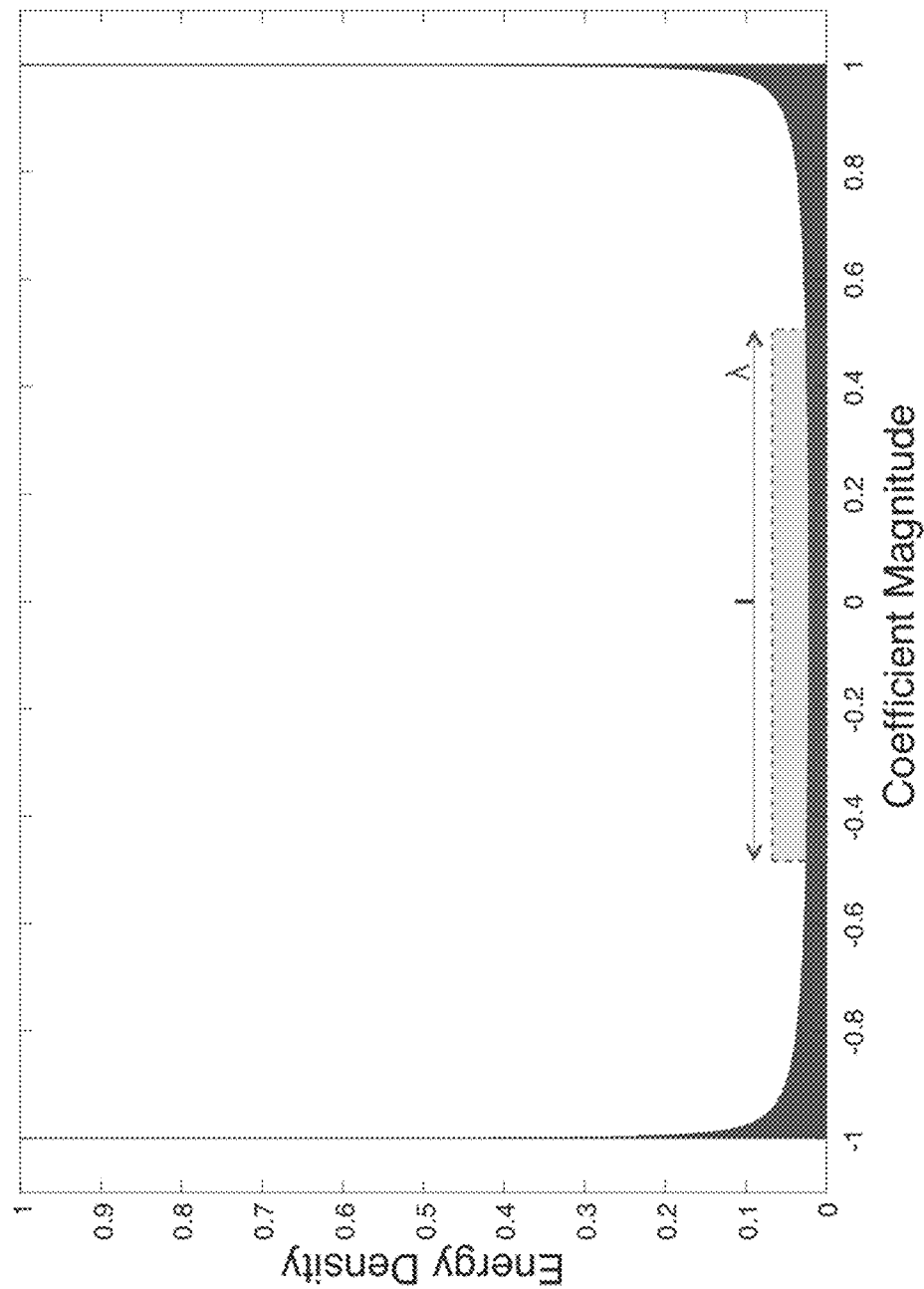
FIG. 7 illustrates an energy density associated with an arbitrary-phase HOPS waveform as a function of a magnitude of coefficients pruned from correlation processing.

Turning now to FIG. 7, an illustration is provided of the relationship between real-valued signal chip voltage density and correlator tap pruning based on coefficient value. It has been found, and as may be appreciated with reference to FIG. 7, that matched-filter coefficients can be dynamically pruned from correlation processing if the precision of the complex multiplications does not provide a benefit (e.g., the received signal is sufficiently dominated by background noise). For the spread spectrum modulations with amplitude-varying chips, such as the Gaussian-shaped digital chaotic sequences, a form of dynamic pruning may also be pursued consistent with the selective noise cancellation methods. Such selective cancellation methods work well in sequentially executed software-based receivers, but do not translate well to architectures that require hardware present for all possible logical conditions unless pre-configuration of the chosen thresholds is defined. For the arbitrary-phase HOPS waveform, a parameter Π. may be defined to represent the magnitude of coefficients to be pruned from correlation processing, resulting in the modified real-valued coefficient chip voltage density shown in FIG. 7. The constant envelope spreading chips ensure that if $$\min_{I,Q}\{|y_I|, |y_Q|\} < \lambda, \text{ then } \max_{I,Q}\{|y_I|, |y_Q|\} > \sqrt{1-\lambda^2},$$

and correlation processing of that chip results in a loss of $$1 - \min_{I,Q}\{|y_I|, |y_Q|\}^2.$$

Figure 8:
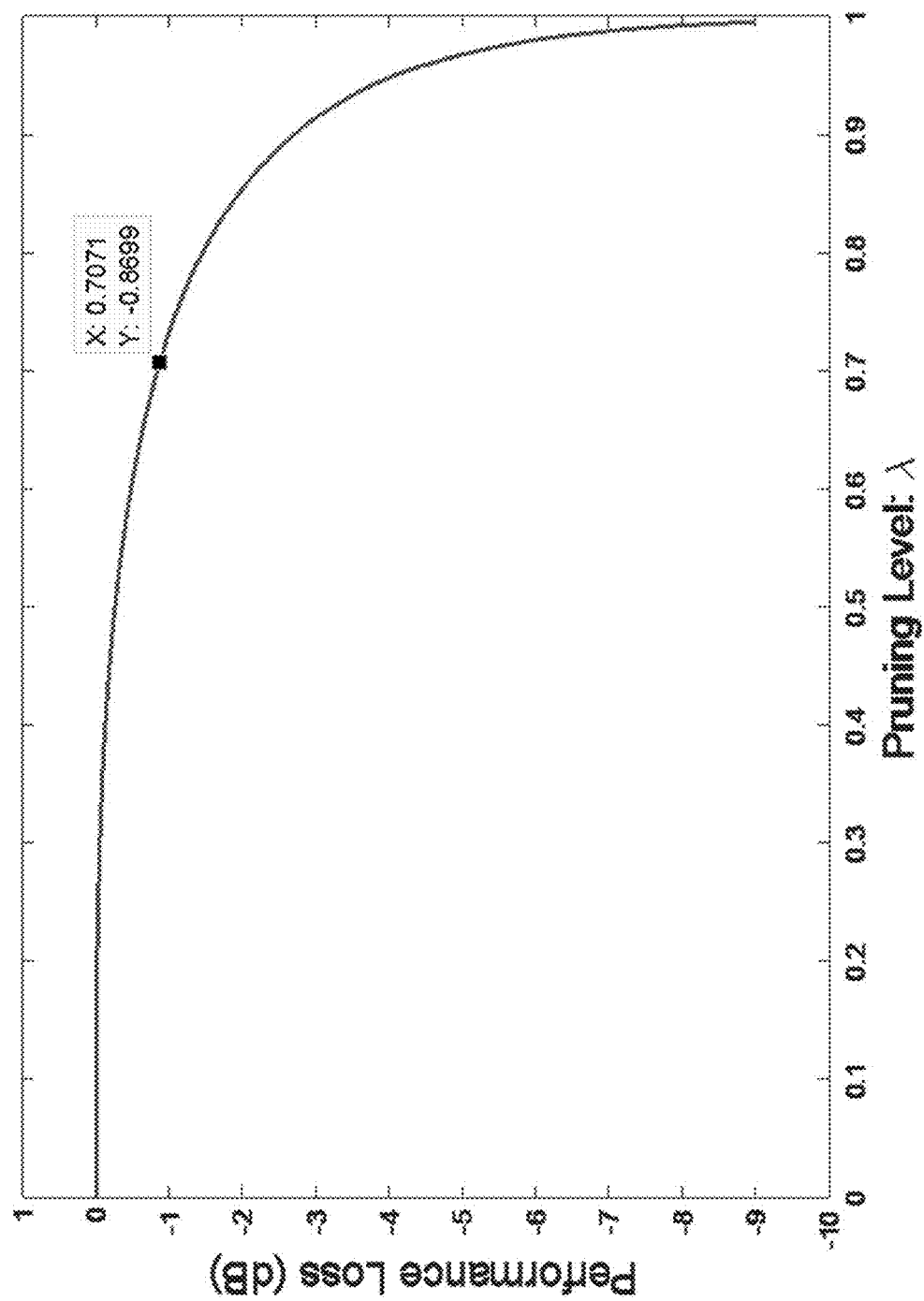
FIG. 8 illustrates an overall decision statistic performance loss as a function of coefficient pruning level, $\lambda$.

The overall decision statistic performance loss is provided in FIG. 8, as a function of $\lambda$. At $\lambda=\sqrt{2}/2$, the median value, this pruning corresponds to a simulated performance loss of approximately 0.87 dB. Further, this median value enables the pruning process to be reduced to picking the largest of $\{|y_I|, |y_Q|\}$, for the following approximation of the complex multiplication:

$$z \approx \begin{cases} x_I y_I - jx_I y_Q, & |y_I| \geq |y_Q| \\ x_Q y_Q + jx_Q y_I, & |y_I| < |y_Q| \end{cases}$$

Figure 9:
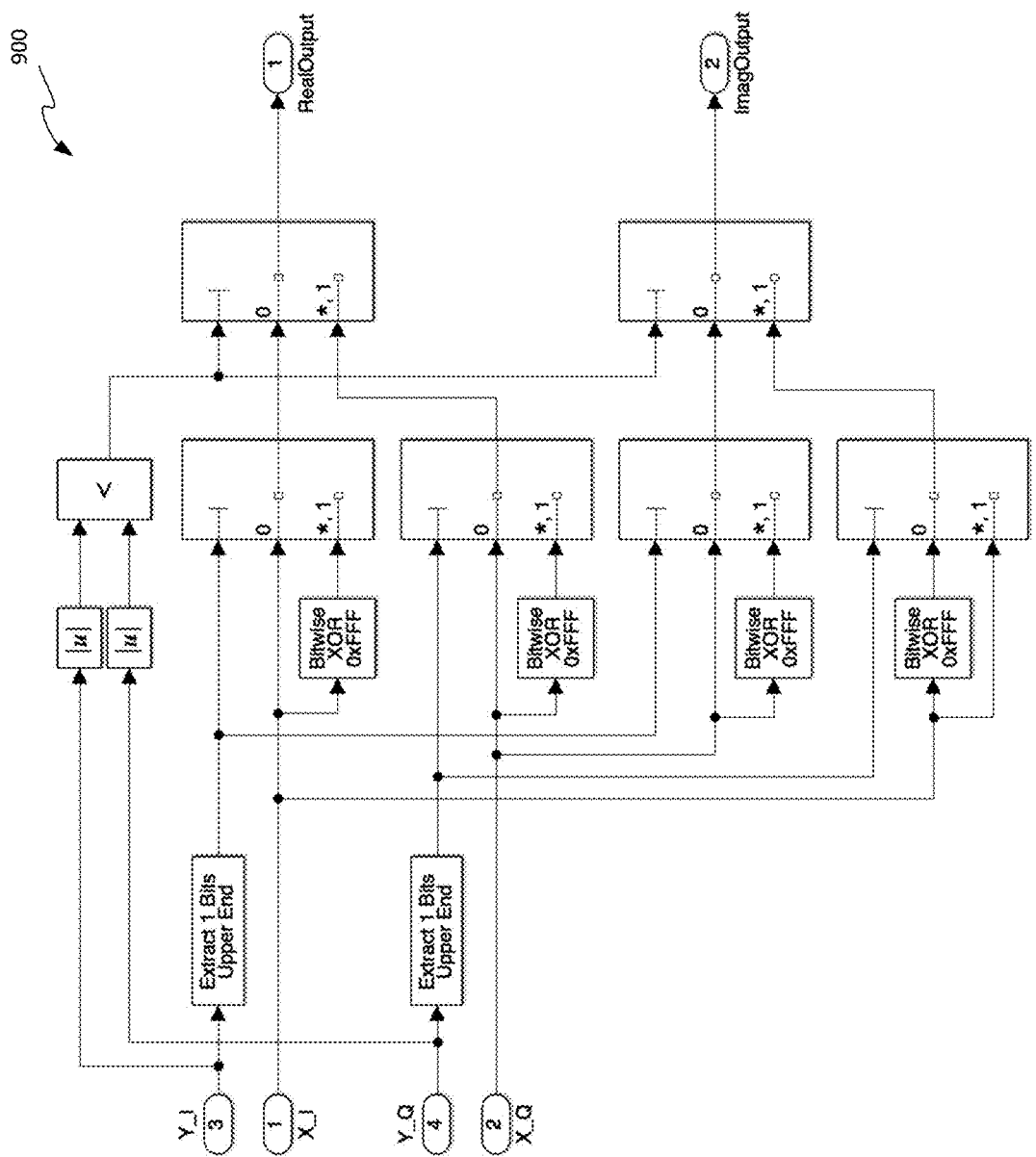
FIG. 9 illustrates a hardware simplified one-bit complex multiplication for the chosen value of $\lambda=\sqrt{2}/2$.

Referring to FIG. 9, an exemplary logic implementation 900 for 1-bit multiplications with pruned coefficients ($\lambda=\sqrt{2}/2$) is depicted. As shown in FIG. 9, for a simulated performance loss of approximately 1.45 dB when combined with the 1-bit truncated coefficients, the hardware logic can be reduced to just sign-selective routing logic and a single effective adder (an unsigned comparator). Smaller values of $\lambda$ provide only marginally less loss and require dynamic placement of the adders. These adders are predictable upon definition of the matched filter tap coefficients, but to dynamically allocate them on a burst-to-burst basis is likely to take more routing logic than simply provisioning all taps with the brute-force matched-filter correlator structure.

Resource Folding

Resource folding may be used to reduce resource utilization by running the core computational elements at a faster-than-real-time clock speed, often transforming parallel operations into a few sequential operations that share a reduced-size parallel circuit. For embodiments of the fallthrough correlator, this folding can be applied to the complex-multiply accumulator circuitry 520, 530 without impacting the delay line structure 510 containing received signal samples. Each additional fold requires increased routing logic to manage the commutation and de-commutation of the delay line inputs. An ASIC-based correlator structure can take full advantage of this resource folding, since it is not limited by the static embedded LUT structure of an FPGA.

Folded Correlator Taps

Figure 10:
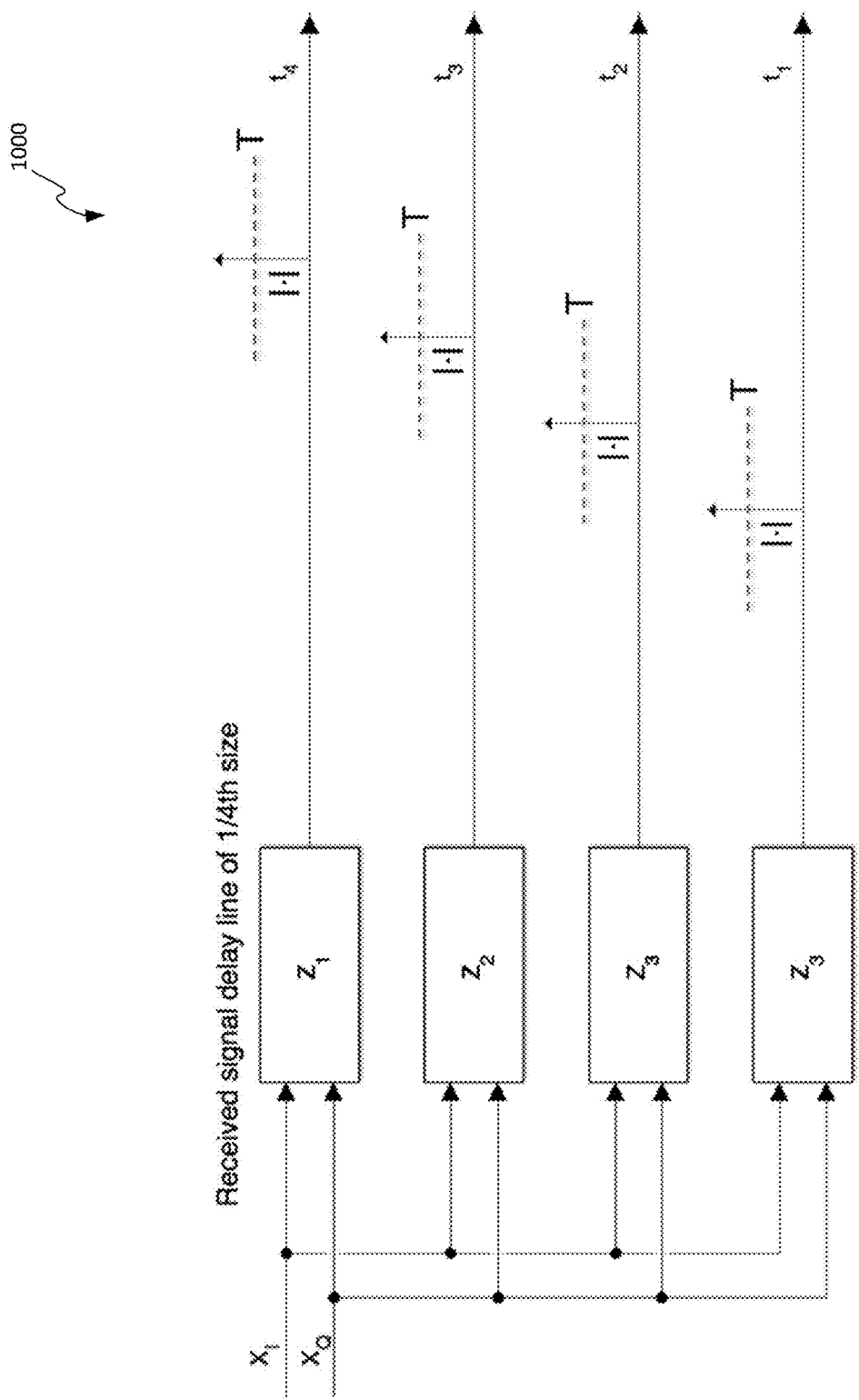
FIG. 10 illustrates a structural correlator in which the sequence of matched-filter coefficients is folded four times, reducing the received signal delay line by a corresponding factor of four.

Turning now to FIG. 10, there is illustrated a structural correlator 1000 in which the sequence of matched-filter coefficients is folded four times. The correlator 1000 provides an example of an alternative and/or additional folding mechanism that may be implemented by consciously aliasing the correlation taps onto each other, for a received signal delay line of shorter length. In the example of FIG. 10, the sequence of matched-filter coefficients is folded four times to produce four separate correlator outputs that operate on the same received signal delay line of one-fourth its original length. Additional control and/or state logic is required to handle detection of the overall preamble signal. Options to implement this include: (1) four sequential peak detects of one-fourth the overall threshold, (2) clear/reset control logic for the accumulator circuit, with incrementing thresholds at each stage, and (3) a pipelined addition of complex-valued correlator outputs, where the storage registers are appropriately sized according to the probability of false-accept at each stage.

With option (1), the implementation used for the hardware prototype discussed below, the detection of lightly spread signals will provide for an unacceptable increase in false positives; however, the self-interference characteristics of deeply spread signals is sufficiently dominated by background noise such that the performance degradation is acceptable. For a correlator of true one-fourth size, the hardware prototype fallthrough correlator implements the resource folding described above to compute each correlator output using the same circuitry with different correlation taps as each received signal sample is clocked in. The hardware reduction is substantial compared to resource folding alone, since the received signal delay line is often a significant contributor to resources for spread spectrum signals (and registered with larger bit resolution than the internal sequences).

FPGA Prototype Validation

A selection of fallthrough correlator design variants were implemented in an Altera Arria 10 SoC FPGA for comparison of detection performance and resource utilization, including (1) a brute-force matched-filter correlator model, (2) a 1-bit truncated complex-valued coefficients model, (3) a $\lambda=\sqrt{2}/2$ pruned 1-bit coefficients model with 8× resource folding, and (4) a 1-bit truncated complex-valued coefficients with 8× resource folding and 4× folded correlator taps. A summary of the low-power enhancements allocated to each correlator model is provided in Table I. Each of the prototypes are built for reception of the arbitrary-phase HOPS spread spectrum waveforms, and synthesized from the same Verilog hardware description language (HDL) source code for all non-correlator modules or entities.

TABLE I

Hardware Prototype Descriptions

| Model | 1-Bit Truncation | Coeff. Pruning | Resource Folding | Folded Corr. Taps |
|---|---|---|---|---|
| 1 | | | | |
| 2 | X | | | |
| 3 | X | X | X | |
| 4 | X | X | X | X |

Figure 11:
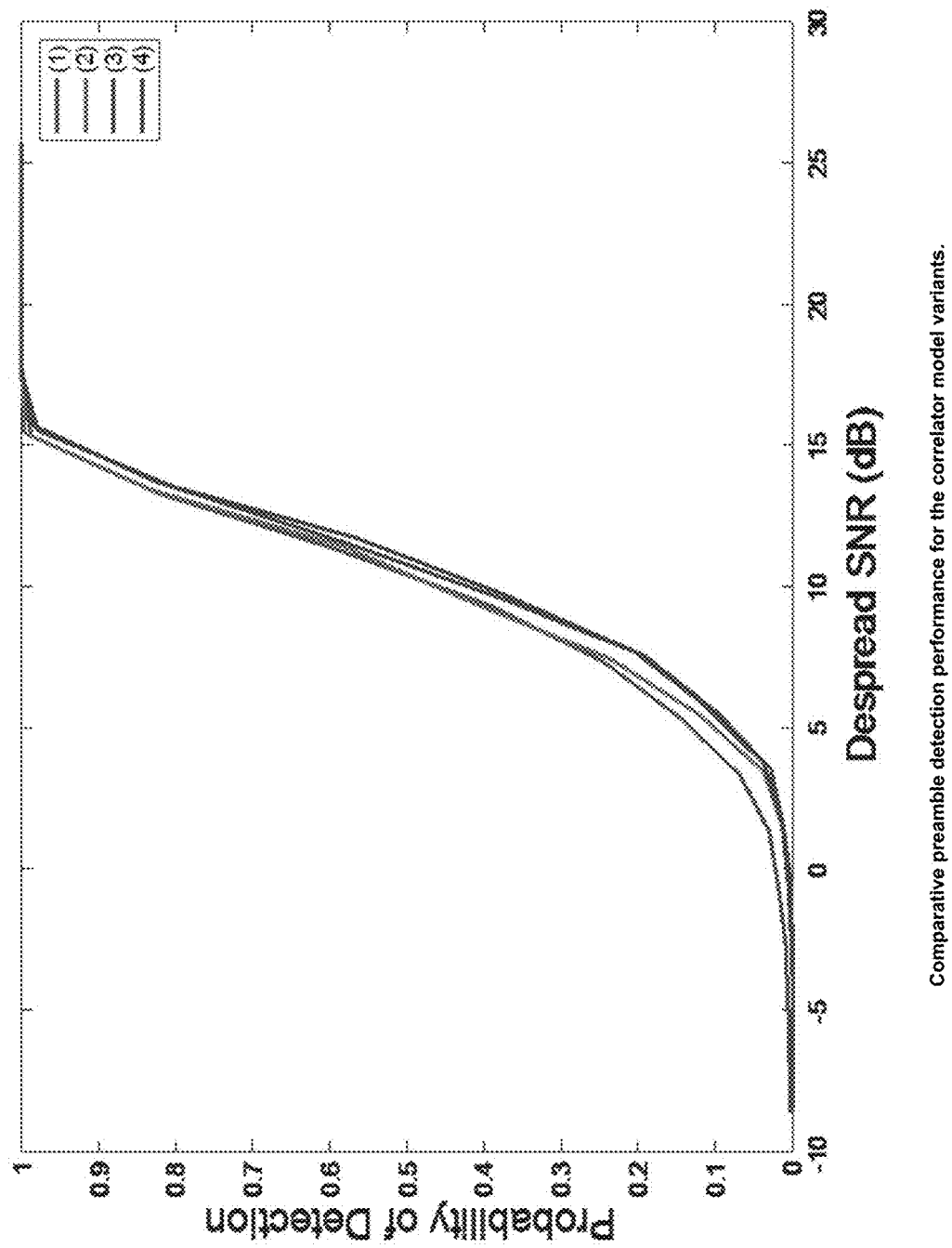
FIG. 11 illustrates probability of preamble detection as a function of signal-to noise (SNR) ratio for a set of hardware prototypes of a fallthrough correlator configured in accordance with the disclosure.

FIG. 11 illustrates probability of preamble detection as a function of signal-to noise (SNR) ratio for the set of fallthrough correlator hardware prototypes referenced in Table I. The performance results represented by FIG. 11 were obtained using an adaptive detection threshold scheme. To ensure the detector performance measurements were accurate, the detection threshold was set such that the probability of false detection $P_{fd}$ was practically zero for all test runs. As expected, the computationally reduced correlators do yield reduced performance, yet in a very controlled manner. Interestingly, (2) provides nearly identical performance to (1) for detection probability $P_d > 0.5$. The overall performance of (3) and (4) is similar, likely due to the increased $P_{fd}$ for (4) and the constraint placed on the detection threshold.

Of primary interest is the comparative hardware resource utilization for each correlator design. Using the Quartus II fitter reports, the figures of interest were extracted and are provided in Table II, focusing on the use of adaptive logic modules (ALMs), combinational adaptive look-up tables (ALUTs), dedicated logic registers, and DSP blocks. For (2), the 1-bit truncated coefficients remove the need for hardware multipliers, and require a similar number of ALMs as (1). In (4) the ALM usage is less than 14% that of (1) and does not use any DSP blocks.

TABLE II

COMPARATIVE RESOURCE UTILIZATION

| Model | ALMs Needed | Combinational ALUTs | Dedicated Registers | DSP Blocks |
|---|---|---|---|---|
| 1 | 79000 | 144690 | 180035 | 4200 |
| 2 | 72801 | 145281 | 117985 | 0 |
| 3 | 21598 | 19434 | 51595 | 0 |
| 4 | 10883 | 19954 | 24161 | 0 |

With respect to the fallthrough correlator corresponding to Model 1 in Table II, the brute-force design would not fit on the device used for the testing. As a consequence, the utilization numbers for Model 1 are estimated from that of a 4× resource folding model, where the complex-multiplier/accumulator is clocked at 4× the sample clock. In Table II, all resources at the higher rate were scaled by a factor of four.

Summary of Selected Improvements

A variety of candidate improvements to a fallthrough correlator structure that enables significant reductions in hardware utilization with minimal overall degradation to preamble detection performance are disclosed herein. One of the more promising candidates is the correlator design (2), in which the amplitude-selective collapse of complex-valued multipliers at each tap to a single real-valued adder has been found to be possible with only marginal detector performance degradation. Also of particular interest is correlator design (4), which demonstrates that the folding of the correlator delay pipeline for real-time processing of deeply spread signals enables processing consolidation from a brute force 4200 embedded multipliers (DSP blocks) and 79000 ALMs to a reduced figure of 0 multipliers and ~11000 ALMs at a modest penalty of <2 dB.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A high-order phase-shift-keying signaling (HOPS) receiver, comprising:
   a correlation apparatus, including:
      a sequence generator configured to generate a non-repeating preamble sequence wherein the non-repeating preamble sequence changes during each of a plurality of time epochs; and
      a fallthrough correlator, including:
         a tapped delay line for receiving a set of complex-valued samples of a received signal wherein the tapped delay line includes a plurality of taps and wherein each of the plurality of taps is separated by one of a corresponding plurality of delay elements;
         a plurality of complex multipliers, each of the plurality of complex multipliers coupled to one of the plurality of taps and being configured to multiply at least one of the complex-valued samples of the received signal by one of a plurality of matched filter coefficients wherein the plurality of matched filter coefficients correspond to values of the non-repeating preamble sequence during one of the plurality of time epochs; and
         a summation module including a plurality of adders wherein ones of the plurality of adders include a first input coupled to an output of one of the plurality of complex multipliers and a second input coupled to an output of one other of the plurality of adders, wherein a last of the plurality of adders outputs a correlation signal; and
   a peak detector with an input configured to receive the correlation signal and an output providing a trigger signal when a peak value of the correlation signal exceeds a threshold value.

2. The HOPS receiver of claim 1 wherein the peak detector is further configured to use a magnitude of the peak value to estimate a power level of the received signal.

3. The HOPS receiver of claim 2 wherein the sequence generator is further configured to dynamically vary at least one of a length of the non-repeating preamble sequence and adjust a detection threshold based on the estimate of the power level of the received signal.

4. The HOPS receiver of claim 1 wherein at least one of the plurality of complex multipliers includes a sign-selected adder tree.

5. The HOPS receiver of claim 4 wherein the sign-selected adder tree includes an induced sign flip multiplication module and an adder.

6. The HOPS receiver of claim 1 wherein the correlation apparatus is responsive to a pruning control signal to dynamically reduce a number of the plurality of matched filter coefficients by dynamically reducing a number of the plurality of complex multipliers used to multiply the complex-valued samples of the received signal.

7. The HOPS receiver of claim 1 wherein the received signal includes a series of signal bursts and wherein the fallthrough correlator is configured to use the correlation signal to determine at least one of frequency offsets and precision timing of ones of the signal bursts.

8. The HOPS receiver of claim 1 wherein each of the plurality of complex multipliers is implemented with at least one of: (i) a reduced precision relative to a precision of the complex-valued samples of the received signal and (ii) one-bit precision.

9. A method for correlating a sampled version of a received signal with a non-repeating preamble sequence, the method comprising:

generating the non-repeating preamble sequence wherein the non-repeating preamble sequence changes during each of a plurality of time epochs;

receiving a set of complex-valued samples of the received signal using a tapped delay line wherein the tapped delay line includes a plurality of taps and wherein each of the plurality of taps is separated by one of a corresponding plurality of delay elements;

for each of the complex-valued samples of the received signal, performing a complex multiplication by multiplying the complex-valued sample of the received signal by one of a plurality of matched filter coefficients using one of a plurality of complex multipliers wherein the plurality of matched filter coefficients correspond to values of the non-repeating preamble sequence during one of the plurality of time epochs; and summing results of the complex multiplications to provide a correlation signal wherein a peak value of the correlation signal exceeds a threshold value when a sufficient correlation exists between the set of complex-valued samples of the received signal and the values of the non-repeating preamble sequence.

10. The method of claim 9 further comprising using a magnitude of the peak value to estimate a power level of the received signal.

11. The method of claim 10 further comprising dynamically varying at least one of a length of the non-repeating preamble sequence and adjusting a detection threshold based on the estimate of the power level of the received signal.

12. The method of claim 9 further comprising dynamically reducing a number of the plurality of matched filter coefficients by dynamically reducing a number of the plurality of complex multipliers used to multiply the complex-valued samples of the received signal.

13. The method of claim 9 wherein at least one of the complex multiplications is performed using asynchronous digital logic.

14. The method of claim 9 wherein the received signal includes a series of signal bursts, the method further including using the correlation signal to determine at least one of frequency offsets and precision timing of ones of the signal bursts.

* * * * *